United States Patent
Maue et al.

[19]

[11] Patent Number: 6,116,110
[45] Date of Patent: *Sep. 12, 2000

[54] MULTI-FUNCTIONAL APPARATUS EMPLOYING AN ELECTRO-MAGNETIC DEVICE AND AN INTERMITTENT MOTION MECHANISM

[75] Inventors: H. Winston Maue, Farmington Hills; Eric J. Krupp, Canton, both of Mich.

[73] Assignee: Lear Automotive Dearborn, Inc., Southfield, Mich.

[*] Notice: This patent is subject to a terminal disclaimer.

[21] Appl. No.: 08/986,856

[22] Filed: Dec. 8, 1997

Related U.S. Application Data

[63] Continuation of application No. 08/431,148, Apr. 28, 1995, Pat. No. 5,694,812.

[51] Int. Cl.[7] ........................................... G05G 9/06
[52] U.S. Cl. ...................... 74/471 R; 15/250.001; 292/DIG. 25
[58] Field of Search .................. 74/89.18, 471 R, 74/84 R, 89; 70/237, 277; 15/250.001, 250.16, 250.17, 250.18, 250.31; 292/201, DIG. 43, DIG. 25, DIG. 29; 49/394

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,659,237 | 11/1953 | Wood . |
| 2,953,802 | 9/1960 | Ziegler . |
| 3,163,791 | 12/1964 | Carlson . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,574,882 | 4/1971 | Petry . |
| 3,619,676 | 11/1971 | Kawakami . |
| 3,665,772 | 5/1972 | Beard et al. . |

(List continued on next page.)

FOREIGN PATENT DOCUMENTS

| | | |
|---|---|---|
| 1.281.424 | 12/1961 | France . |
| 822 178 | 11/1951 | Germany . |
| 25 29 702 | 1/1977 | Germany . |
| 27 27 454 | 12/1978 | Germany . |
| 28 30 772 | 1/1980 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1931 | Japan . |
| 5-86761 | 4/1993 | Japan . |
| 530287 | 12/1940 | United Kingdom . |
| 743720 | 1/1956 | United Kingdom . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

"Goodheart–Wilcox Automotive Encyclopedia", William K. Toboldt, Larry Johnson, Steven W. Olive, 1989, pp. 723–727.

(List continued on next page.)

*Primary Examiner*—David A. Bucci
*Assistant Examiner*—Brandon C. Stallman
*Attorney, Agent, or Firm*—MacMillan, Sobanski & Todd, LLC

[57] ABSTRACT

A multi-functional apparatus employs an electromagnetic device. The electromagnetic device selectively causes movement of an intermittent motion mechanism thereby moving a mechanical device coupled thereto. In another aspect of the present invention, a single electric motor selectively actuates three intermittent motion mechanisms thereby causing three mechanical devices coupled thereto to operate. In a further aspect of the present invention, a clutch mechanism selectively drives a window wiper. A method for operating the multi-functional apparatus of the present invention is also provided.

21 Claims, 12 Drawing Sheets

OTHER PUBLICATIONS

"Automotive Handbook", Bosch 3rd Edition, 1993, pp. 694–697.

"Kinematic Analysis of Mechanisms", 1959, J.E. Shigley, pp. 228–231.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

"Genevamation Indexing Drives", Jan. 12, 1995 Catalog No. 693, Geneva Mechanisms Corporation.

"Saab Owners Workshop Manual", Haynes Publishing Group 1981, 1986, pp. 172–174, 237.

Machine Design, "Mechanisms for Intermittent Motion, Part 1" Dec. 1951, Otto Lichtwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 145–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1952, pp. 255–261.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

Product Engineering, "Kinematics of Intermittent Mechanisms III—The Spherical Geneva Wheel", by S. Rappaport, Oct. 1949, pp. 137–139.

MULTI-FUNCTIONAL APPARATUS EMPLOYING AN ELECTRO-MAGNETIC DEVICE AND AN INTERMITTENT MOTION MECHANISM

CROSS REFERENCE TO RELATED APPLICATIONS

This is a continuation of U.S. patent application Ser. No. 08/431,148, filed Apr. 28, 1995, which issued on Dec. 9, 1997 as U.S. Pat. No. 5,694,812.

This application relates to the following simultaneously filed patent applications, which are incorporated by reference herewithin: U.S. application Ser. No. 08/430,388 entitled "Multi-Functional Apparatus Employing an Intermittent Motion Mechanism" by James Wayne Gibson and William C. Zimmer; and U.S. application Ser. No. 08/431,149 entitled "Control System for an Automotive Vehicle Multi-Functional Apparatus" by H. Winston Maue, Shawn P. Slusser, Jeffrey L. Kulczycki and Ronald Zaleski.

BACKGROUND OF THE INVENTION

This invention relates generally to multi-functional apparatuses and specifically to a multi-functional apparatus employing an electromagnetic device for use in an automotive vehicle.

Almost all automotive vehicles have a single or a pair of windshield wiper assemblies. These assemblies traditionally include rubber wiper blades mounted upon claw brackets. These claw brackets are pivotably attached to wiper arms mounted upon rotating shafts. These shafts are either directly driven by electric motors or driven by a single electric motor which actuates series or parallel-coupled four-bar linkage mechanisms. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like.

Examples of conventional window wiper assemblies and motor mechanisms are disclosed with the following U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider et al. on Sep. 26, 1972; and, U.S. Pat. No. 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors or solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise, and failure modes are increased.

SUMMARY OF THE INVENTION

In accordance with the present invention, the preferred embodiment of a multi-functional apparatus employs an electromagnetic device. The electromagnetic device selectively causes movement of an intermittent motion mechanism thereby moving a mechanical device coupled thereto. In another aspect of the present invention, a single electric motor selectively actuates three intermittent motion mechanisms thereby causing three mechanical devices coupled thereto to operate. In a further aspect of the present invention, a clutch mechanism selectively drives a window wiper. A method for operating the multi-functional apparatus of the present invention is also provided.

The multi-functional apparatus of the present invention is advantageous over conventional systems since the present invention combines many different functions into a single apparatus. For example, the present invention multi-functional apparatus replaces the traditional separate rear wiper motor, liftgate lock/unlock motor and rear window unlock solenoid. Accordingly, the present invention multi-functional apparatus significantly reduces the piece cost, assembly cost, part proliferation and handling costs, and wiring costs as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Moreover, a lost linkage mechanism is not necessary to allow for manual overriding of the motorized multi-functional apparatus of the present invention. Additional advantages and features of the present invention will become apparent from the following description and appended claims, taken in conjunction with the accompanying drawings.

DETAILED DESCRIPTION OF THE PREFERRED EMBODIMENTS

Figure 1:
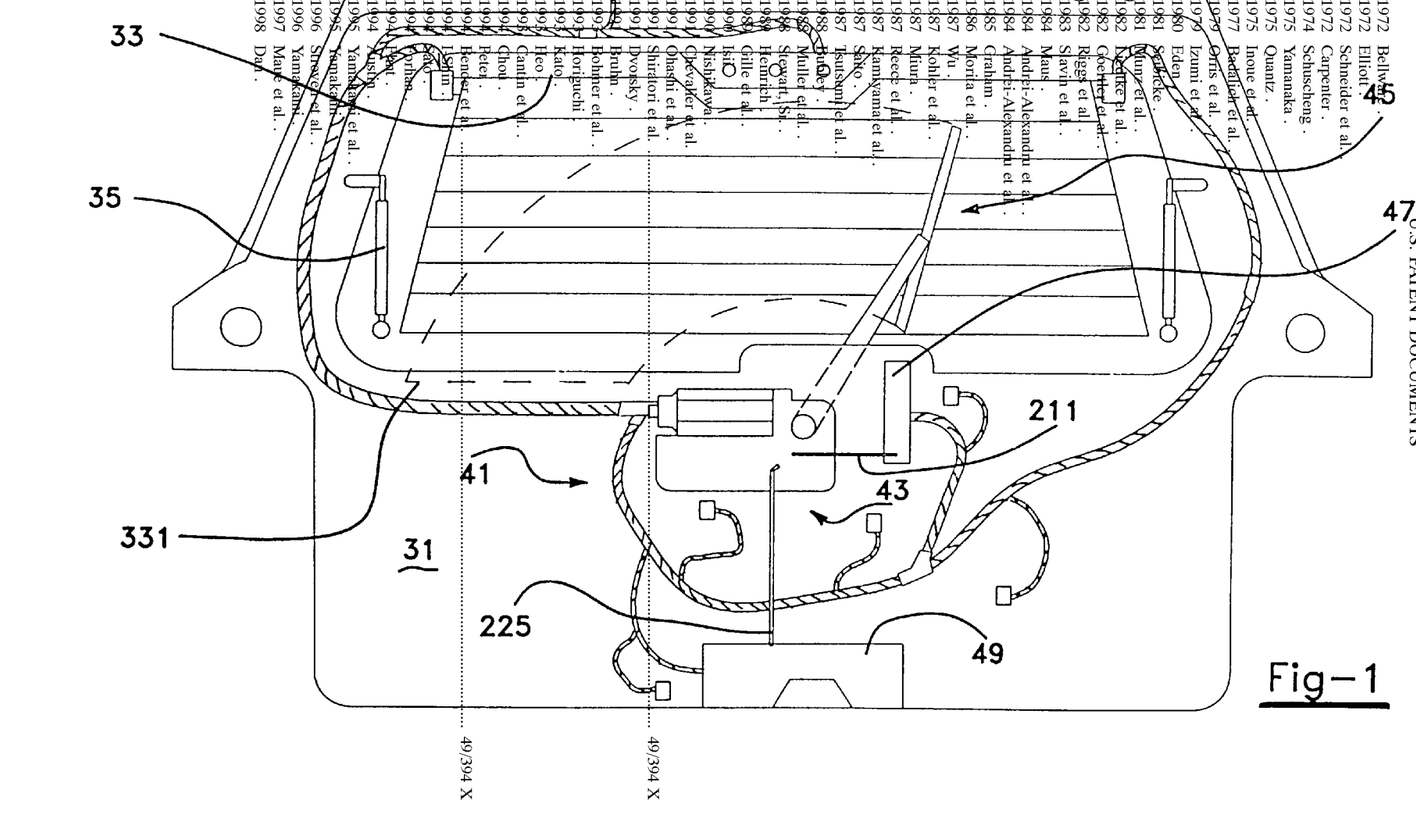
FIG. 1 is a front elevational view showing a first preferred embodiment of a multi-functional apparatus of the present invention.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or backlite 33 pivotable between a closed position, substantially flush with the outer surface of liftgate 31, to an open position about upper hinges. A pair of pneumatic cylinders 35 act to push window 33 toward the open position when a lower portion of window 33 is released. A first preferred embodiment of a multi-functional apparatus 41 of the present invention is mounted upon an inner surface of liftgate 31. The majority of apparatus 41 is hidden by an interior trim panel (not shown). Apparatus 41 includes a central drive and power transmission unit 43, a window wiper assembly 45, a window release latch or lock 47 and a liftgate lock 49, all of which are mounted upon liftgate 31. Examples of such locks (employing separate solenoids or motors, which would be removed in order to couple the lock mechanism for use with the present invention) are disclosed within the following U.S. Pat. No. 5,222,775 entitled "Power Operated Latch Device for Automotive Back Door" which issued to Kato on Jun. 29, 1993; U.S. Pat. No. 4,422,522 entitled "Inertial Lock for Vehicle Door Latch" which issued to Slavin et al. on Dec. 27, 1983; and, U.S. Pat. No. 3,917,330 entitled "Electric Lock Release" which issued to Quantz on Nov. 4, 1975; all of which are incorporated by reference herewithin.

The construction of central drive and power transmission unit 43 is best illustrated in FIGS. 1–4 and 6. An electromagnetic device such as an electric motor 51 is of a conventional fractional horsepower, dc electromagnetic variety having a metallic motor housing within which are stationary permanent magnets, a rotatable armature with wire windings, a rotatable armature shaft 53 joined to the armature, a commutator electrically connected to the wire windings and rotatable with the armature shaft, a brush card assembly and various electronic components. It will be apparent to those skilled in the art that other electric motor constructions can readily be substituted for that shown. A worm gear segment 55 is provided upon a portion of armature shaft 53 extending beyond the motor housing.

Figure 2:
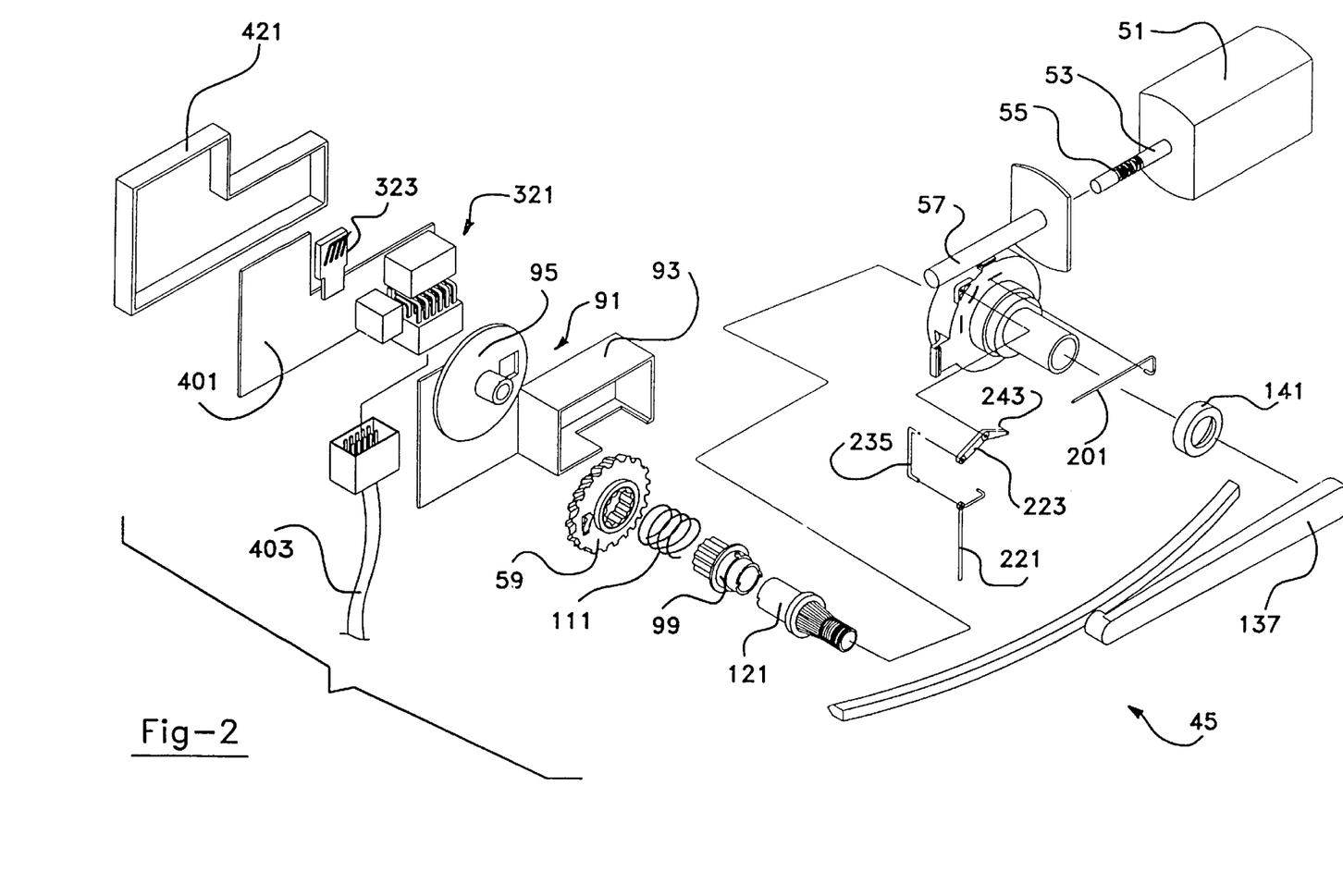
FIG. 2 is an exploded perspective view showing the first preferred embodiment multi-functional apparatus of the present invention.
Figure 4:
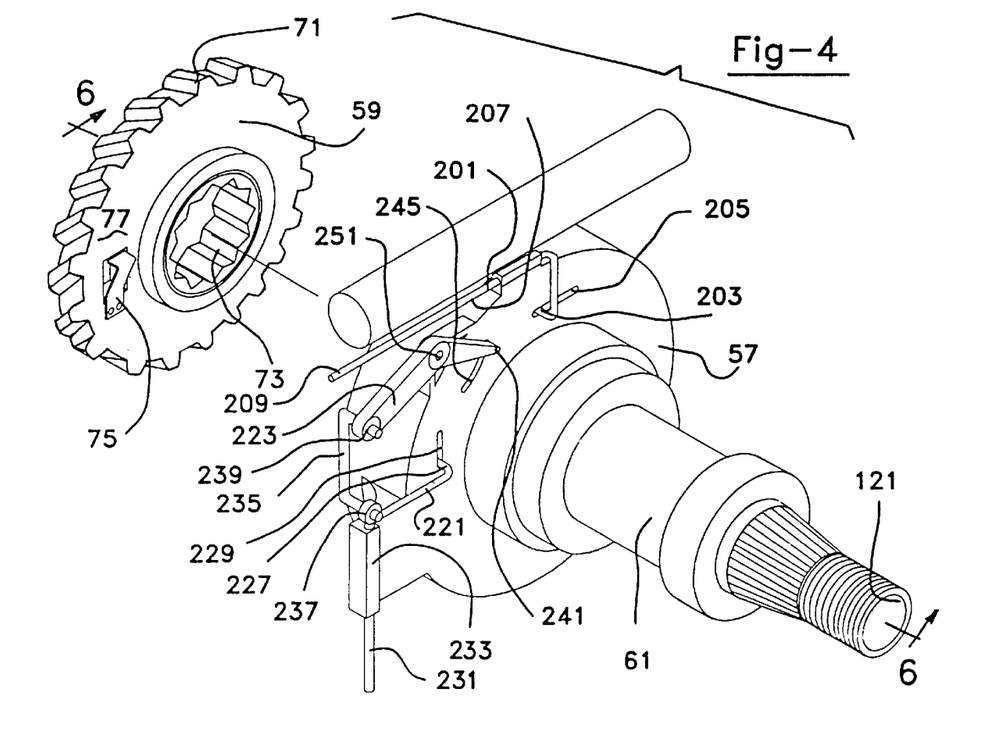
FIG. 4 is a perspective view, with a main gear exploded away therefrom and with an electric motor broken away therefrom, showing the first preferred embodiment multi-functional apparatus of the present invention.
Figure 6:
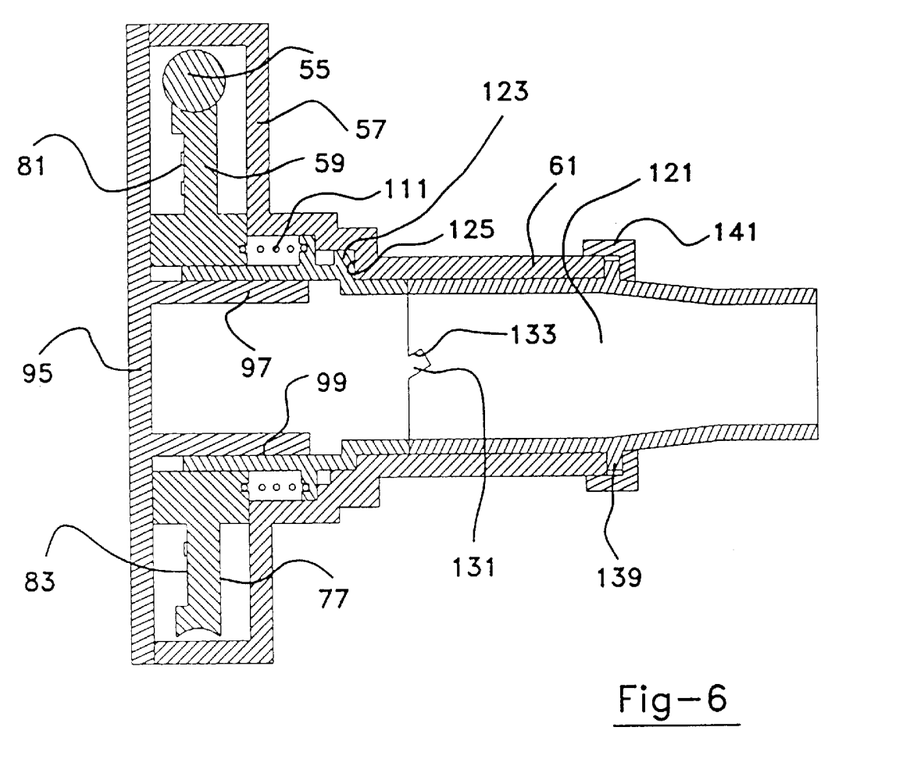
FIG. 6 is a sectional view, taken along line 6—6 of FIG. 4, showing the first preferred embodiment multi-functional apparatus of the present invention with the clutch mechanism in an engaged position.

A gear housing 57 is also provided for receiving worm gear segment 55 and the immediately adjacent portions of armature shaft 53. A main helical gear 59 is also housed and rotatably journalled within gear housing 57. A collar 61 stationarily extends from housing 57 co-axial with a rotational axis of helical gear 59. Gear housing 57 is preferably made from cast aluminum. Helical gear 59 has an external set of helically oriented teeth 71 for meshing with worm gear segment 55. Helical gear 59 further has an internally oriented set of splines 73. A spring tab 75 having a driving interface surface is mounted upon an outer face 77 of helical gear 59 by a pair of rivets, screws, sonic welded pins, hot air cold upset pins, or the like. Spring tab 75 is preferably stamped spring steel. Of course, other driving interface means may be employed such as an integrally molded finger, screw, rivet, compression spring, rib or other similar formations projecting from a face or peripheral portion thereof. Helical gear 59 is preferably injection molded from a polymeric material such as acetyl. An electrically conductive feedback disk 81 is retained to an inside face 83 of helical gear 59 through ultrasonically rolled welding or insert molding. Feedback disk 81 is comprised of a set of copper alloy or brass stamped contacts which are provided with differing conductive and nonconductive patterns depending on the specific positional ranges as will be discussed in greater detail hereinafter. An electronic control module housing 91 has an electronic control module shell section 93 and a gear cover section 95. A cylindrical spindle 97 projects from gear cover section 95.

Figure 3:
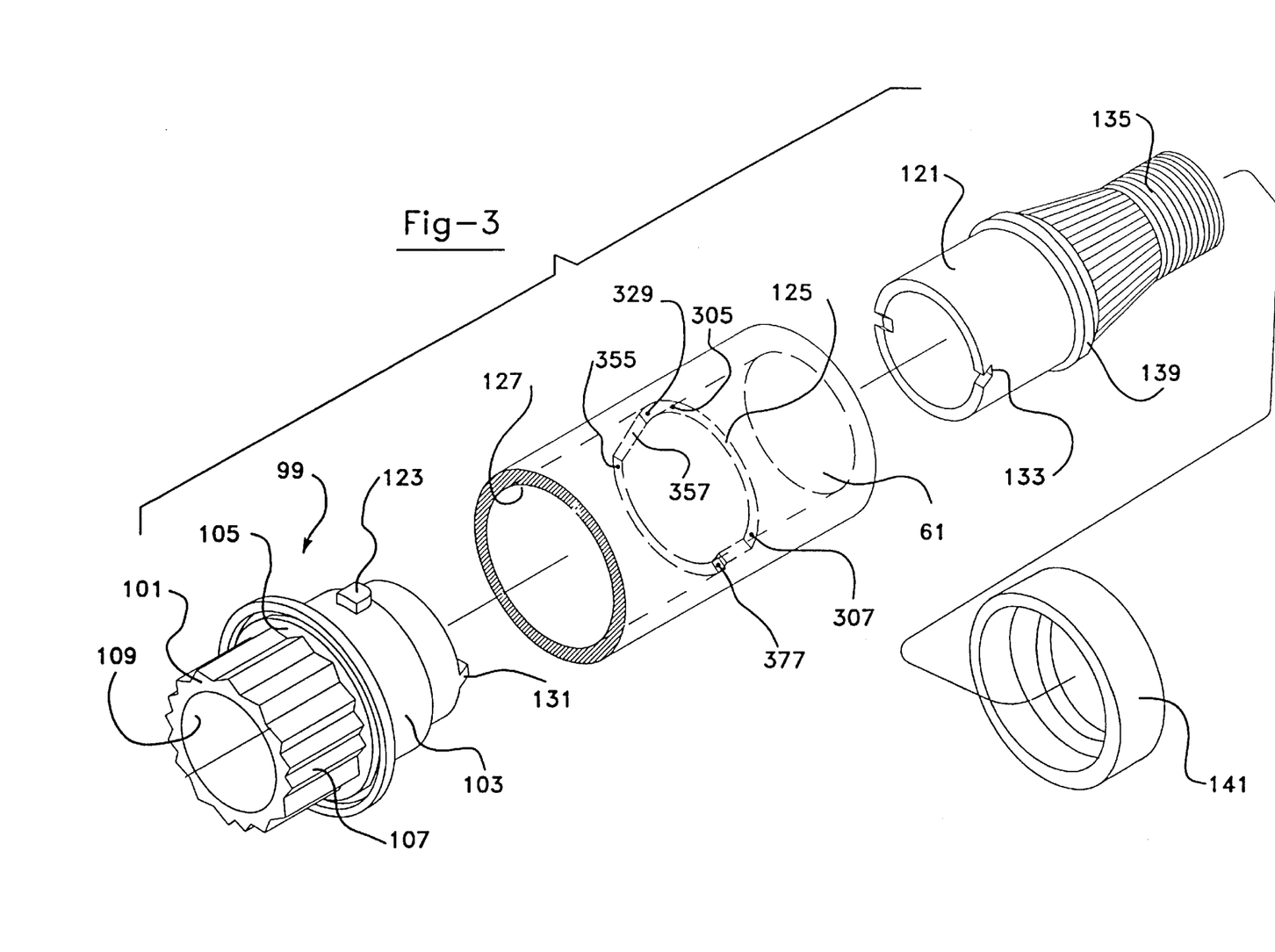
FIG. 3 is an exploded perspective view showing a clutch mechanism of the first preferred embodiment multi-functional apparatus of the present invention.

An actuator shaft 99 has a spur gear segment 101 and a carrier segment 103 divided by an annular flange 105. Spur gear segment 101 has a set of splines 107 around an exterior peripheral surface thereof for longitudinally sliding along, while remaining enmeshed with splines 73 of helical gear 59. Spur gear segment 101 further has an internal cylindrical passageway 109 journalled upon spindle 97 of gear cover section 95. A stiff compression spring 111 is disposed between flange 105 and a hub of helical gear 59 for biasing actuator shaft 99 toward a driven window wiper shaft 121. Actuator shaft 99 additionally contains a cam follower 123 extending from a peripheral surface thereof. Cam follower 123 rotatably rides along a camming surface 125 within a stepped bore 127 of collar 61. Use of a standard lubricant may be desired. A pair of angled fingers 131, in the form of a helix, project from an edge of actuator shaft 99 so as to disengagably couple with matching receptacles 133 within wiper shaft 121. Wiper shaft 121 further has a distal end with threads 135 thereon upon which is attached a wiper arm 137 and nut in a conventional manner. Wiper shaft 121 further has a circular brim 139 which provides a bearing surface upon a distal edge of collar 61. A cap 141 with an aperture therein serves to retain brim 139 against collar 61. Actuator shaft 99 and wiper shaft 121 comprise a "split shaft" construction that act in conjunction with camming surface 125 to define a clutch mechanism. Actuator shaft 99 is preferably powdered metal while wiper shaft 121 is made from cold rolled steel.

Referring to FIGS. 1, 2 and 4, window lock 47 is actuated by an intermittent motion mechanism further defined as a liftgate window release lock linkage 201. Window linkage 201 is constructed from a steel wire. A leading end 203 of window linkage 201 is bent so as to extend through a slot 205 in gear housing 57. Furthermore, a median segment 207 of window linkage 201 is linearly slidable within a passageway formed through gear housing 57. A trailing end 209 of window linkage 201 is coupled to a window lock connecting rod 211.

A primary lock linkage 221 and a secondary lock linkage 223 are coupled to liftgate lock 49 through a connecting rod 225. Primary lock linkage 221 is also a bent steel wire having a leading end 227 protruding within a slot 229 of gear housing 57. A median segment 231 is slidably trapped within a support 233 extending from gear housing 57. A C-shaped bent wire 235 couples an elbow 237 of primary lock linkage 221 to a distal end 239 of secondary lock linkage 223. Secondary lock linkage 223 further has a proximal end 241 with a pin 243 protruding therefrom which enters an arcuate slot 245 of gear housing 57. Secondary lock linkage 223 is pivotable about a central fulcrum 251 mounted to gear housing 57. Wire 235 can be pivotably joined to primary and secondary lock linkages, respectively 221 and 223, via bent metal wire clips, polymeric force-fit collars, push nuts or the like. Linkages 209, 221 and 223 may also be coupled to their respective connecting rods through similar fasteners. Lock linkages 221 and 223 are also considered to act as intermittent motion mechanisms based on their selectively actuated operation as will be discussed hereinafter. Linkages 201, 221 and 223 may alternately be constructed as pivoting or sliding members, having an infinite variety of shapes, and constructed from plastic, cast metal, powdered metal, bent wire, geared members or the like. It should further be understood that the connecting rods may be substituted by cables, belts, gears, a plurality of mechanical linkages, chains, jackscrews or other force transmitting and coupling means.

Figure 5:
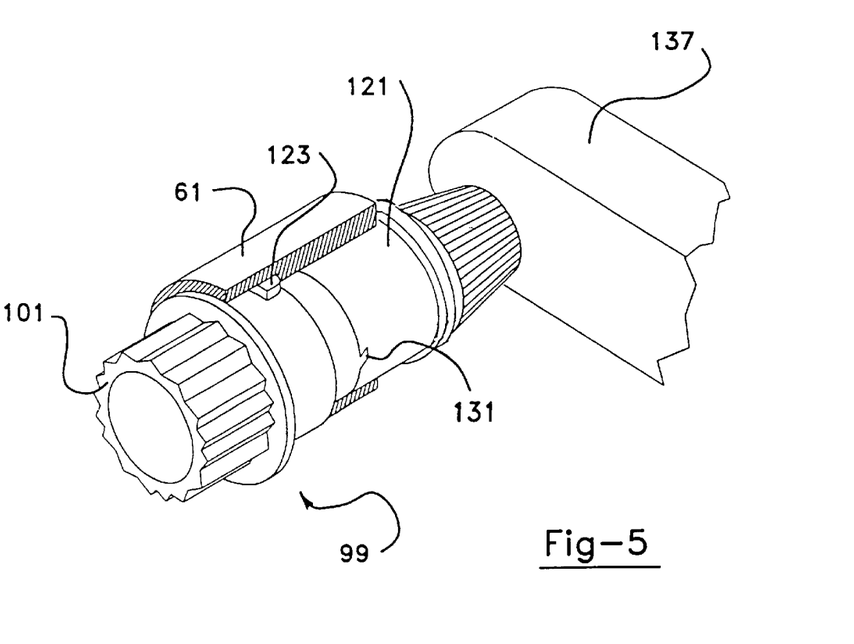
FIG. 5 is a fragmentary perspective view showing the clutch mechanism of the first preferred embodiment of the present invention multi-functional apparatus in an engaged position.
Figure 7:
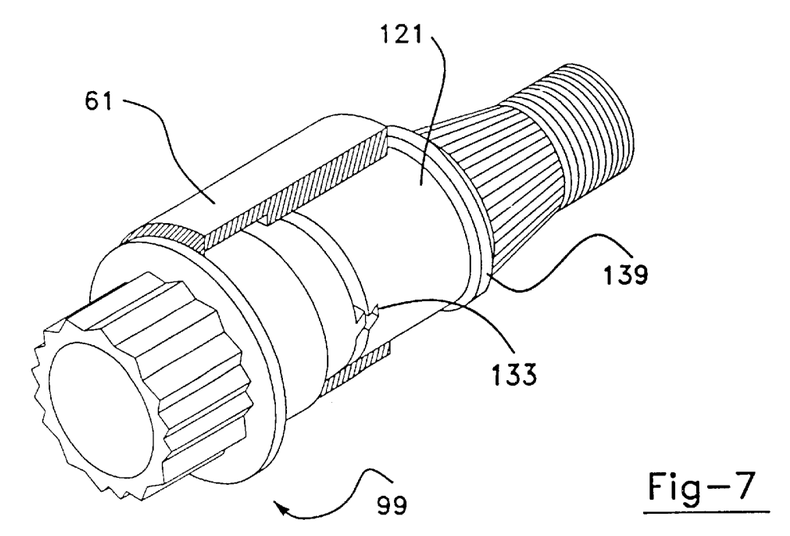
FIG. 7 is a fragmentary perspective view showing the clutch mechanism of the first preferred embodiment multi-functional apparatus of the present invention in a disengaged position.
Figure 8:
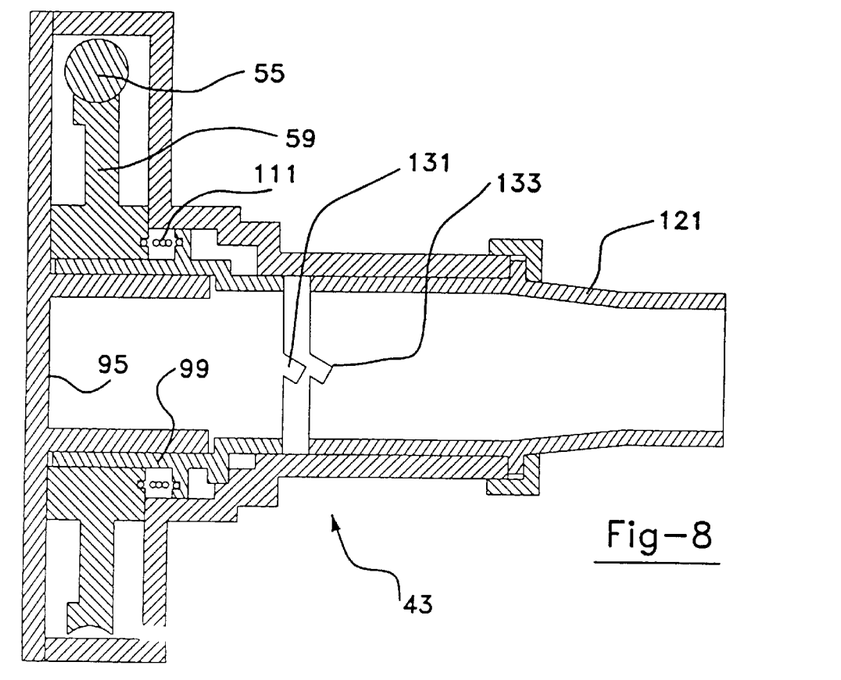
FIG. 8 is a sectional view, similar to that of FIG. 6, showing the first preferred embodiment of the present invention multi-functional apparatus with the clutch mechanism in a disengaged position.
Figure 9:
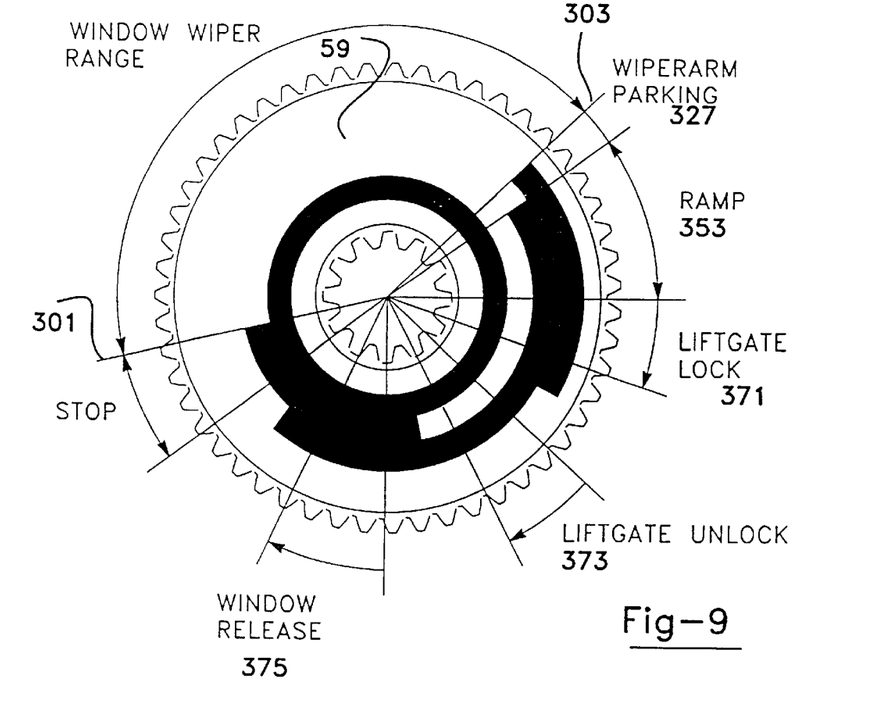
FIG. 9 is a diagram showing positional ranges of the main gear of the first preferred embodiment multi-functional apparatus of the present invention.

The operation of the clutch mechanism employed with the present invention can best be understood by referring to FIGS. 2, 3, and 5 through 9. When a rear window wiper switch is set in an operational mode, motor 51 causes spring tab 75 and helical gear 59 to oscillate or reciprocate within a wiper positional range defined between points 301 and 303 (FIG. 9). Concurrently therewith, cam follower 123 of actuator shaft 99 rides along camming surface 125 between positions 305 and 307 (FIG. 3). During this cyclical oscillating wiper operation, fingers 131 of actuator shaft 99 are fully engaged with receptacles 133 in wiper shaft 121 as is shown in FIGS. 5 and 6. Accordingly, wiper arm 137 and wiper shaft 121 rotate in unison in conjunction with actuator shaft 99 and helical gear 59. An electronic control unit 321 measures the rotation of helical gear 59 through feedback disk 81 acting in conjunction with four electrical contactors 323 riding therealong. When wiper arm 137 and feedback disk 81 reach the end of the wipe path at point 301, electronic control unit 321 actuates a normally closed relay 325 (see FIG. 18), arranged in an H-bridge configuration, to reverse the polarity and rotational direction of the armature within motor 51.

When the rear wiper switch is turned to an off setting, the electronic control unit 321 instructs motor 51 to rotate helical gear 59 to a wiper arm parking position 327. This causes cam follower 123 to return to camming surface position 305 and then on to parking position 329. Thus, the wiper assembly is moved off of rear window 33 (see FIG. 1) and onto a holding bracket on liftgate door 31 (also see FIG. 1) designated as wiper blade park/depressed position 331. This allows for movement of rear window 33 (see FIG. 1) without interference of the wiper assembly.

When a liftgate lock/unlock or window release switch is activated, electronic control unit 321 rotates helical gear 59 along a ramp positional range 353 whereby cam follower 123 of actuator shaft 99 is moved from position 329 to position 355 along a ramped incline 357 of camming surface 125. Thus, the clutch mechanism causes fingers 131 of actuator shaft 99 to disengage from receptacles 133 of wiper shaft 121 as is shown in FIGS. 7 and 8.

Referring now to FIGS. 1–3 and 9–18, if the liftgate lock switch is activated, then electronic control unit 321 causes motor 51 to rotate helical gear 59 and spring tab 75 through liftgate locking positional range 371. Accordingly, spring tab 75 moves from the orientation shown in FIG. 10 to that shown in FIG. 11. Spring tab 75 acts to directly contact and push leading end 227 of primary lock linkage 221 upward along slot 229. This motion, in turn, causes primary lock linkage 221 to move connecting rod 225 and actuate liftgate lock 49 to a locked orientation. Concurrently therewith, secondary lock linkage 223 is caused to pivot. Electronic control unit 321 again senses the conductive pattern position of the feedback disk through contactors 323 such that when spring tab 75 reaches the position of FIG. 11, motor 51 is subsequently reversed. This returns spring tab 75, helical gear 59 and actuator shaft 99 back to parking position 327. Therefore, the wiper operational mode can be quickly resumed if desired.

Figures 10, 11, 12, 13:
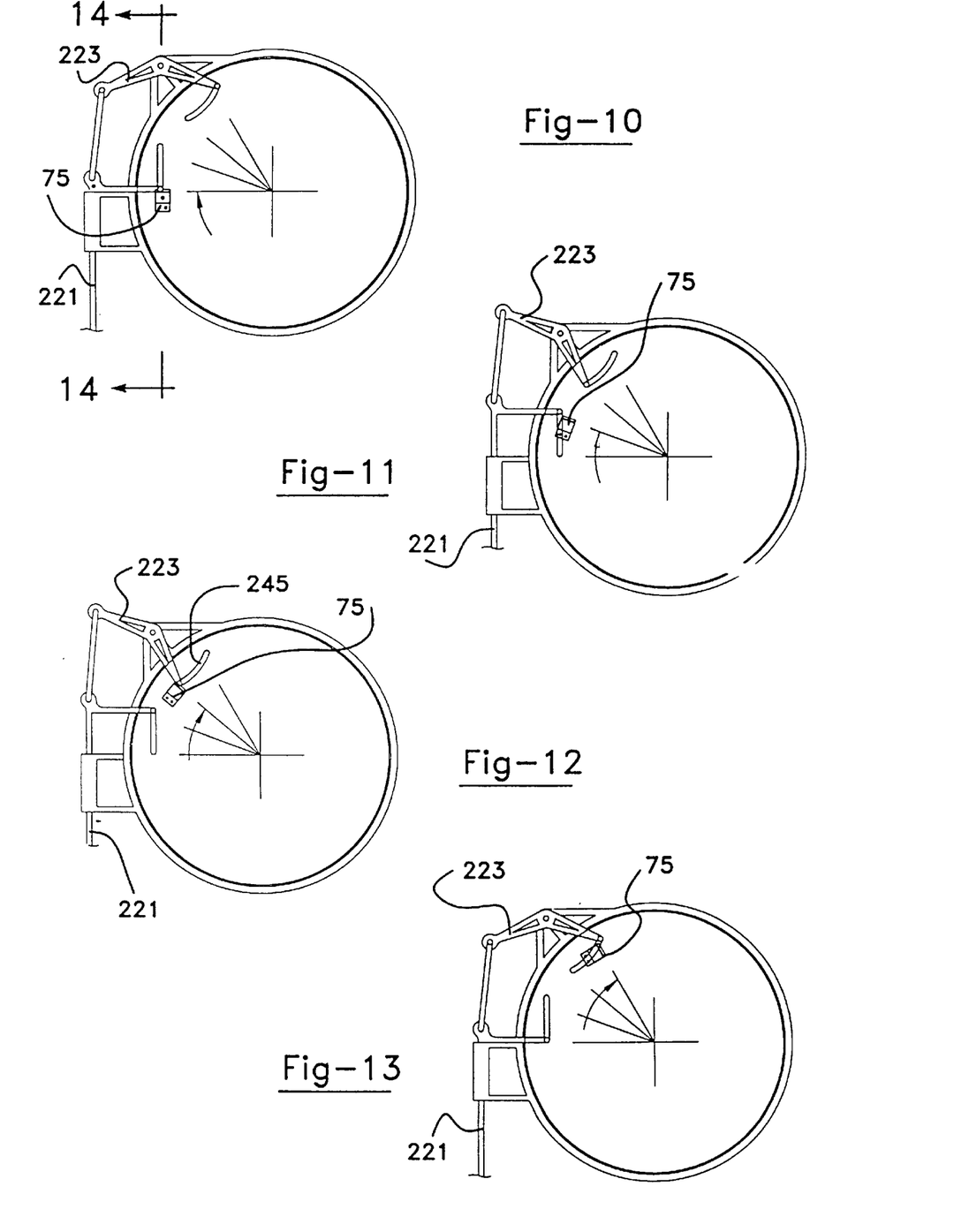
FIG. 10 is a diagrammatic rear view showing the first preferred embodiment of the present invention multi-functional apparatus at the beginning of a liftgate locking movement.
FIG. 11 is a diagrammatic rear view showing the first preferred embodiment of the present invention multi-functional apparatus at the completion of the liftgate locking movement.
FIG. 12 is a diagrammatic rear view showing the first preferred embodiment of the present invention multi-functional apparatus at the beginning of the liftgate unlocking movement.
FIG. 13 is a diagrammatic rear view showing the first preferred embodiment of the present invention multi-functional apparatus at the completion of the liftgate unlocking movement.
Figure 14:
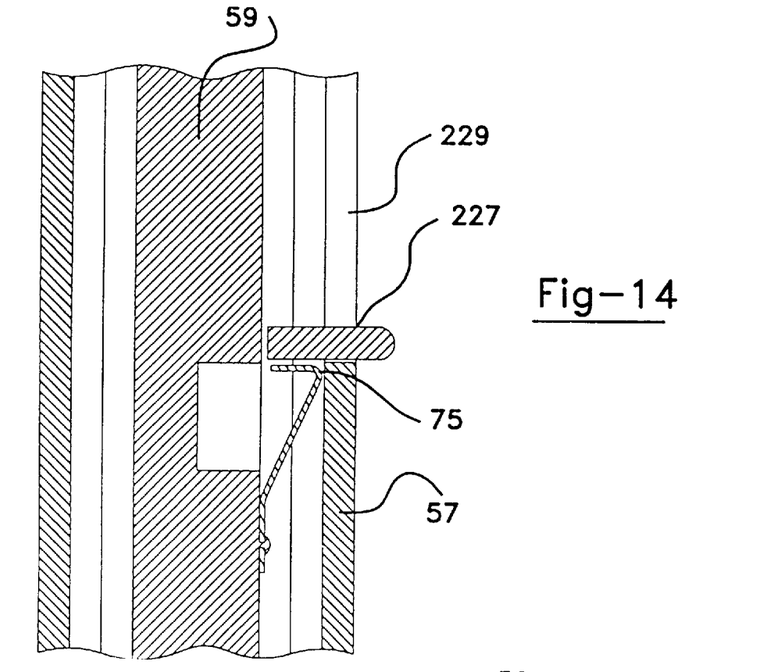
FIG. 14 is an enlarged, fragmentary sectional view, taken along line 14—14 of FIG. 10, showing the first preferred embodiment multi-functional apparatus of the present invention.

When the liftgate unlock switch setting is activated, electronic control unit 321 will energize motor 51 through leads 601 so as to rotate helical gear 59 and spring tab 75 mounted thereto to a liftgate unlock positional range 373, also shown as the movement between FIGS. 12 and 13. Accordingly, spring tab 75 directly contacts and moves pin 243 of secondary lock linkage 223 to upwardly pivot along slot 245. In turn, primary lock linkage 221 is returned to its initial position and connecting rod 225 and liftgate lock 49 are given an unlocked orientation thereby allowing for manual opening of liftgate 31 by way of a liftgate mounted door release. Upon sensing the completion of liftgate unlock positional range 373, electronic control unit 321 causes motor 51 to return spring tab 75, helical gear 59 and actuator shaft 99 back to wiper arm parking position 327.

Figure 15:
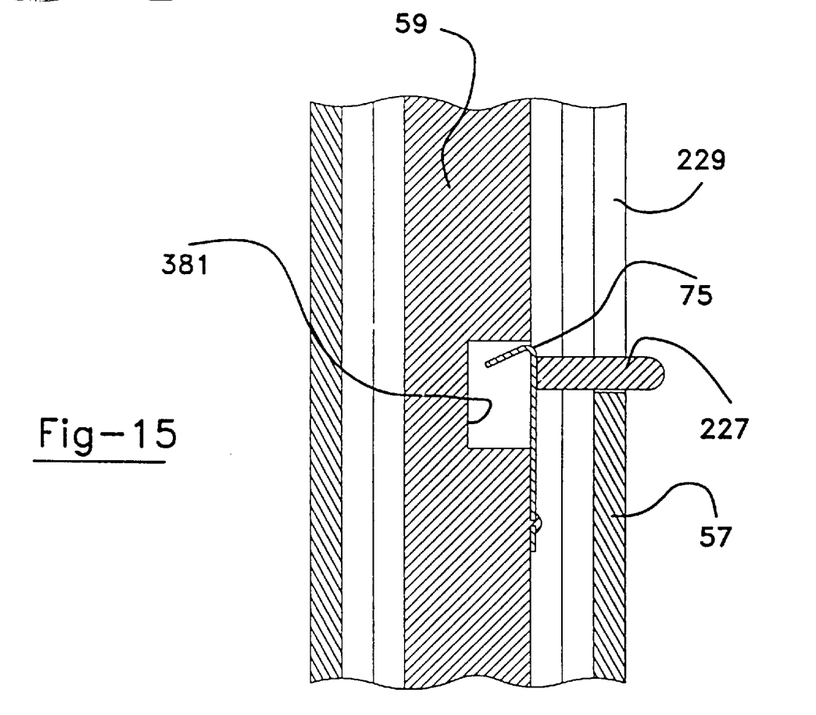
FIG. 15 is a sectional view, similar to that of FIG. 14, showing the first preferred embodiment multi-functional apparatus of the present invention in a reverse direction of rotation.
Figure 18A:
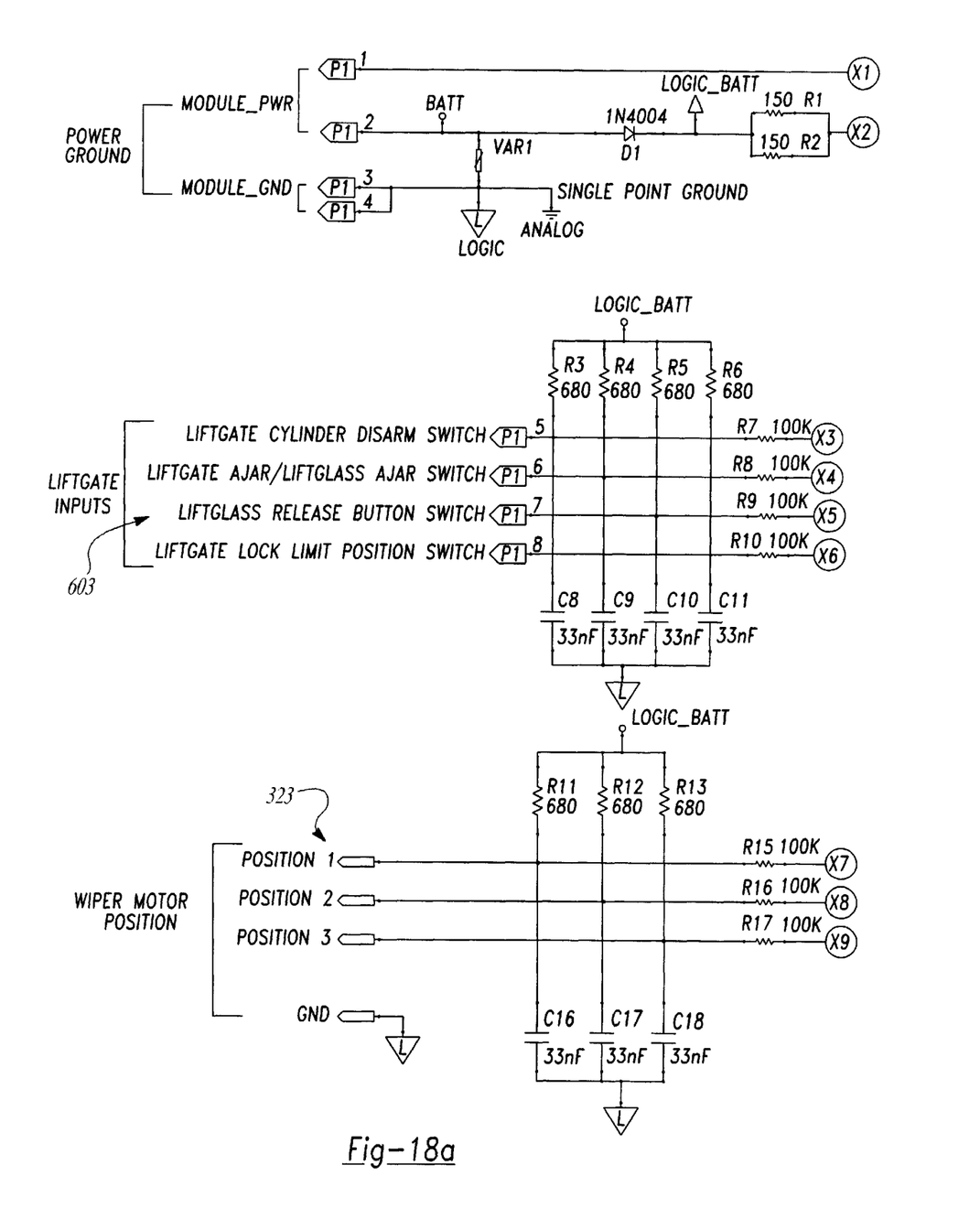
FIGS. 18a–18c are electrical schematic diagrams showing a rear node employed with the first preferred embodiment multi-functional apparatus of the present invention.
Figure 18B:
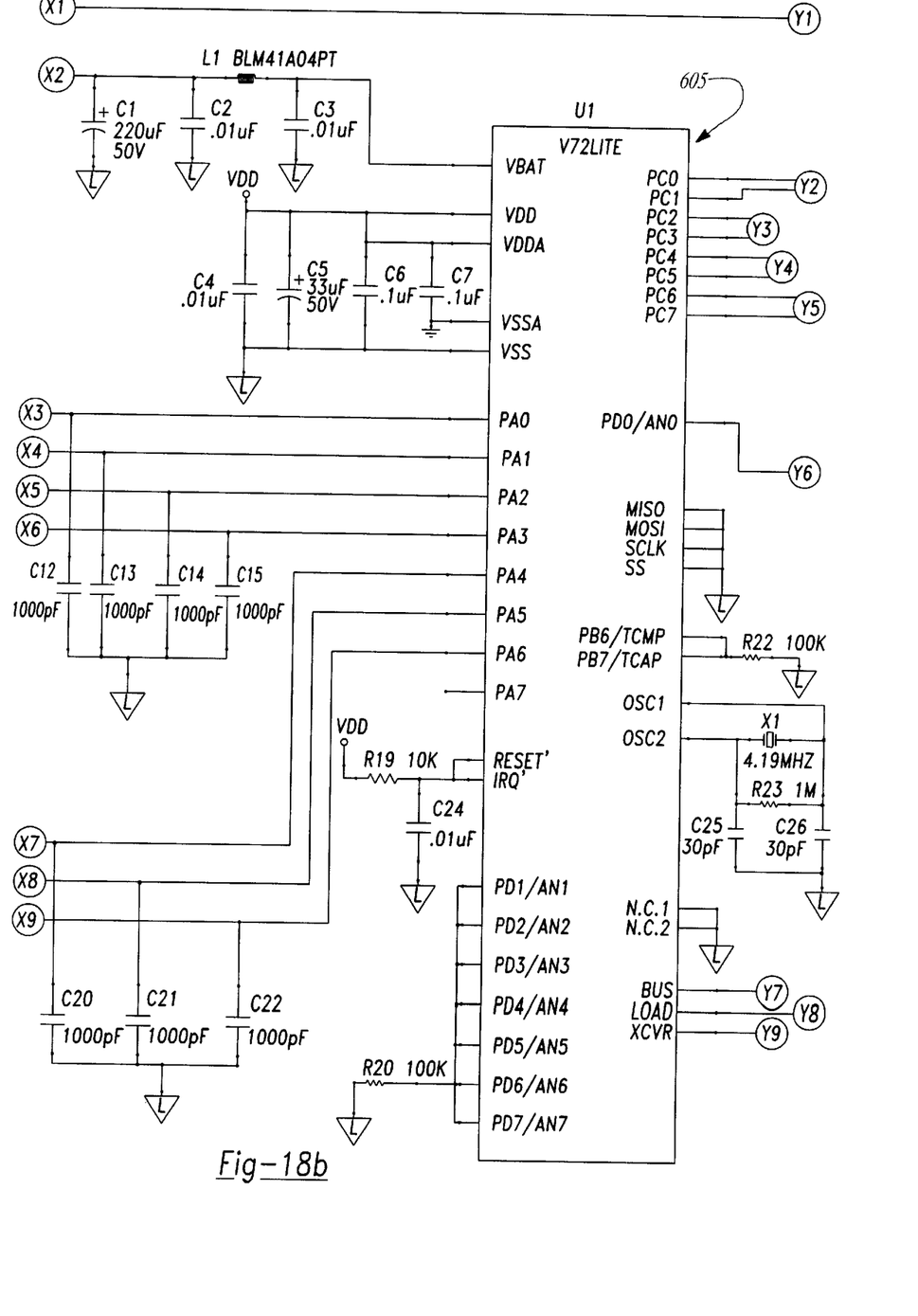
Figure 18C:
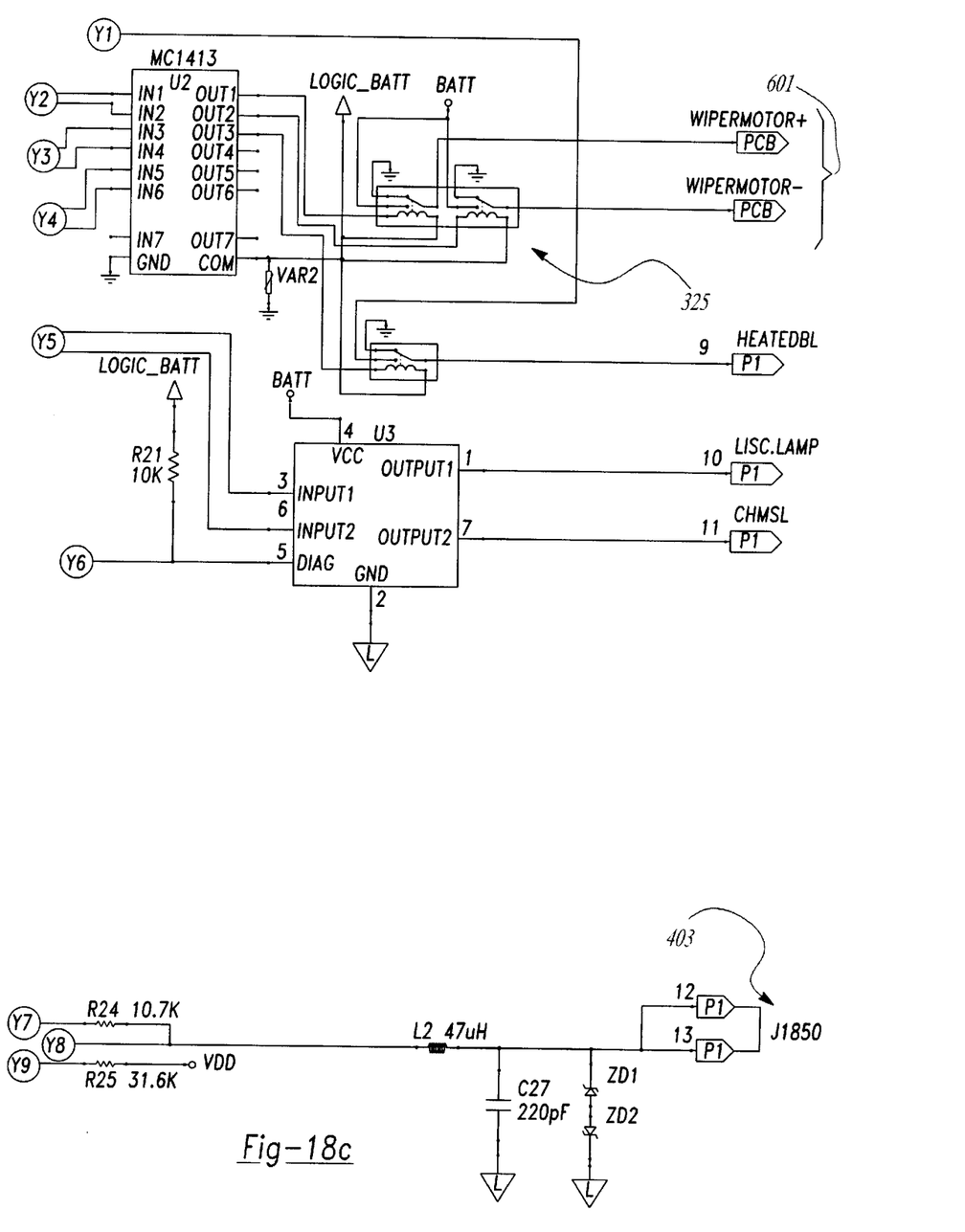

Next, if a liftgate mounted window release push button switch 603 (see FIG. 18) is activated, electronic control unit 321 energizes motor 51 through leads 601 (also see FIG. 18). This causes spring tab 75 on helical gear 59 to rotate through window release positional range 375. Accordingly, spring tab 75 directly contacts against and pushes leading end 203 away from its nominal position, as shown in FIG. 4, along slot 205. This causes connecting rod 211 and window lock 47 to achieve an unlocked or released orientation. Pneumatic cylinders 35 thereby upwardly pivot and open rear window 33. Window linkage 201, connecting rod 211 and window lock 47 are spring biased to return to their nominal locked positions. In the alternative, window linkage 201 could also be integrated as part of connecting rod 211. Additionally, a mechanical stop 377 is provided along camming surface 125 to prevent over travel of cam follower 123. As can be seen in FIG. 15, spring tab 75 is capable of being forced into a pocket 381 within helical gear 59 so as to pass below linkages 201, 223 and 221 during rotation reversal of helical gear 59. Of course, it will be appreciated that the previously discussed positional ranges may have alternate patterns and arrangements, and may include additional or replacement functions.

As can best be observed in FIGS. 2 and 18, electronic control module includes a rear node microprocessor 605 preferably using a Motorola MC68HCO5V6 (or alternately MC68HCO5V7) chip mounted upon a rigid printed circuit board 401. Rear node electronic control unit 321 is electrically connected to a central body computer (not shown) in a multiplexed (MUX) fashion through a wire harness 403. A J1850 MUX protocol is used. An electronic control module cover 421 secures electronic control unit 321 within electronic control module housing 91.

Figure 16:
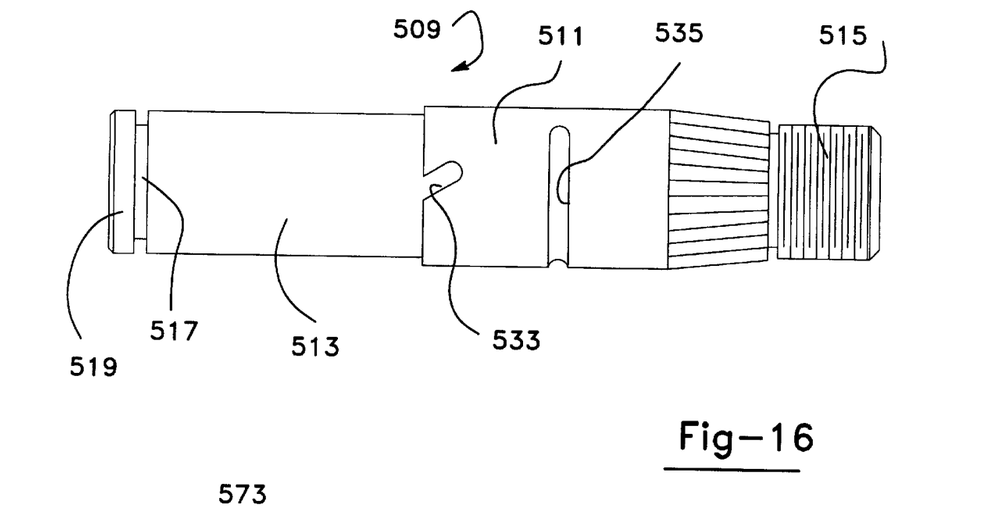
FIG. 16 is a side elevational view showing engaged shafts of a second preferred embodiment multi-functional apparatus of the present invention.
Figure 17:
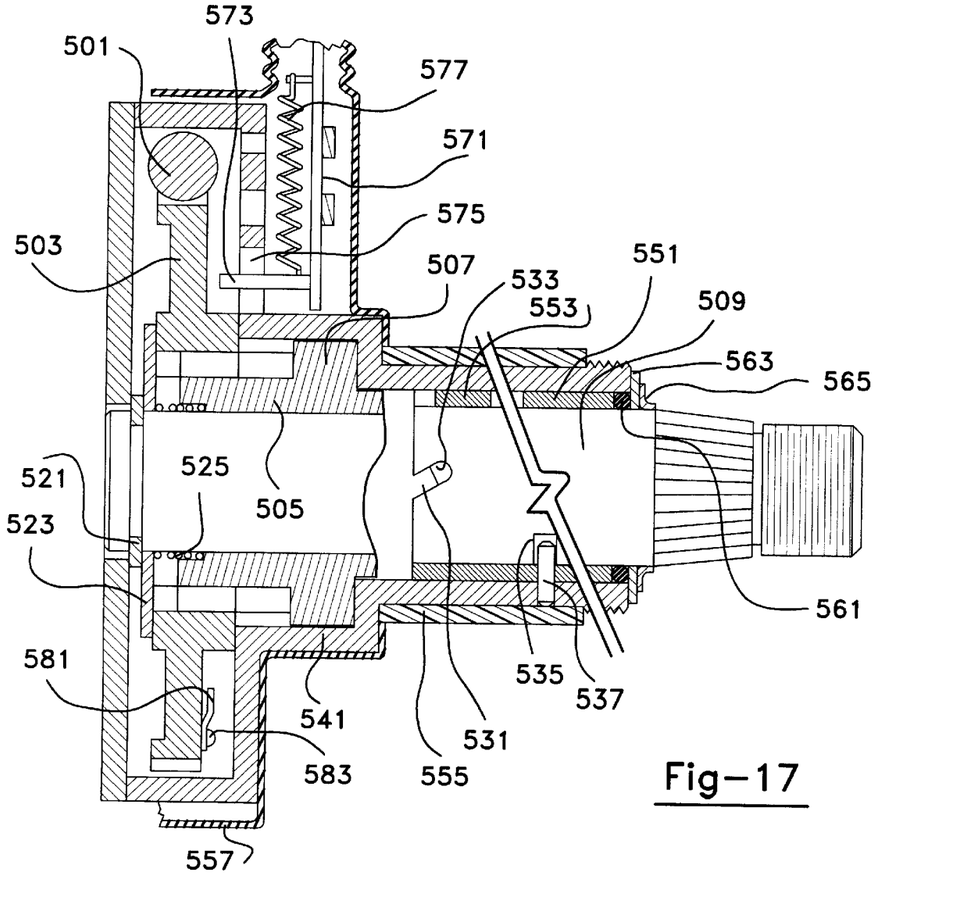
FIG. 17 is a sectional view, similar to that of FIG. 6, showing the second preferred embodiment of the present invention multi-functional apparatus.

A second preferred embodiment of the multi-functional apparatus of the present invention is shown in FIGS. 16 and 17. In this embodiment, a worm gear 501 drives a helical gear 503 and an actuator shaft 505 splined thereto in a manner similar to that of the first preferred embodiment. This second preferred embodiment has various refinements to make the prior embodiment more manufacturable. Actuator shaft 505 has a pair of cam followers 507. A wiper shaft 509 has a larger diameter section 511 and a smaller diameter section 513. A threaded section 515 is disposed adjacent to larger diameter section 511 while an undercut groove 517 and a head 519 are disposed adjacent to smaller diameter section 513. A metallic retaining ring 521 and washer 523 are trapped between head 519 and helical gear 503 so as to maintain the positional location of wiper shaft 509. A compression spring 525 is juxtaposed around smaller diameter section 513 and between actuator shaft 507 and washer 523. Alternately, other biasing means can be used such as leaf springs, flexible plastic fingers or elastomeric materials. Smaller diameter section 513 further acts as a journalling spindle for actuator shaft 507. A pair of fingers 531 extend from an edge of actuator shaft 505 for disengagable coupling to a pair of receptacles 533. A groove 535 is located along a peripheral surface of larger diameter section 511 of wiper shaft 509 for engagement with a pin 537 fastened to a gear housing 541. Bearing members 551 and 553 are mounted between larger diameter section 511 and the adjacent portion of gear housing 541.

A plastic sleeve 555 and a rubber boot 557 surround gear housing 541 to reduce the transmission of any objectional noise created therein. Wiper shaft 509 is further trapped within housing 541 by an O-ring seal 561, a metallic washer 563 and a push-on retaining ring 565. A modified window release lock linkage 571 is disposed within boot 557 and has a leading stepped pin 573 protruding within a slot 575 of gear housing 541. Linkage 571 is biased toward its nominal position by a tension spring 577. A spring clip 581 is also shown attached to helical gear 503 by one or more screws 583. Otherwise, the construction and function of this second preferred embodiment are essentially the same as that of the first preferred embodiment.

While various embodiments of this multi-functional apparatus have been disclosed, it will be appreciated that various modifications may be made without departing from the present invention. For example, a solenoid, electromagnet or other electromagnetic devices may be used in place of the previously described electric motor. Furthermore, additional spur gears, pinion gears, sector gears, planetary gears, jack screws, sprockets and chains, pulleys and belts, cables or other force transmitting means may be employed to couple between the electromagnetic device, rotatable member, clutch mechanism, intermittent motion mechanisms or locks. Moreover, a multiple gear transmission, linkage, belt or cable system can alternately couple a wiper assembly to the wiper shaft. It will further be appreciated that a variety of other multiplexed or non-multiplexed, microprocessor or analog circuitry may be used to control the apparatus of the present invention. The clutch mechanism can also be carried out in a variety of other constructions such as with Belleville springs, diaphragm springs, friction plates, sector gears, linkages or the like. The intermittent motion mechanisms may also be accomplished by employing other known intermittent motion mechanisms such as Geneva mechanisms, starwheel mechanisms, intermittent gearing, escapements, ratchet mechanisms or other known selectively actuable devices. For example, reference should be made to the following U.S. patents which are incorporated by reference herewithin: U.S. Pat. No. 5,228,239 entitled "System for Automatically Opening and Closing Doors of Vehicles" which issued to Heo on Jul. 20, 1993; U.S. Pat. No. 4,352,299 entitled "Intermittent Motion Gear Apparatus" which issued to Riggs et al. on Oct. 5, 1982; U.S. Pat. No. 3,443,455 entitled "Intermittent Motion Device" which issued to Zugel on May 13, 1969; U.S. Pat. No. 3,443,442 entitled "Selectively Operable Intermittent Motion Apparatus" which issued to Schweihs on May 13, 1969; U.S. Pat. No. 3,442,146 entitled "Intermittent Rotary Motion" which issued to Simpson on May 6, 1969; and U.S. Pat. No. 3,421,380 entitled "Intermittent Motion Apparatus" which issued to Mansour on Jan. 14, 1969. The multi-functional apparatus of the present invention can further be employed for windshield wipers, side door locks or other automotive vehicle and non-automotive vehicle applications. While various materials, electronic components, circuits and force transmitting members have been disclosed, a variety of other such materials, electronic components, circuits and force transmitting devices may be used. It is intended by the following claims to cover these and any other departures from the disclosed embodiments which fall within the true spirit of this invention.

The invention claimed is:

1. A multi-functional apparatus comprising:
a window wiper shaft;
an elongated window latch linkage movable between a first orientation and a second orientation; and a single electromagnetic device actuable to selectively operate said window wiper shaft and said linkage.

2. The multi-functional apparatus of claim 1 further comprising:

a main gear selectively rotated by said electromagnetic device;

a clutch mechanism selectively coupling said window wiper shaft to said main gear.

3. The multi-functional apparatus of claim 2 wherein said clutch mechanism includes:

a stationary collar having a longitudinal bore therethrough interrupted by a camming surface; and an actuator shaft having a splined segment enmeshed with teeth of said main gear and longitudinally slidable in relation thereto, said actuator shaft further having a cam follower juxtapositioned for riding along said camming surface of said collar; and means for disengagably coupling said actuator shaft to said window wiper shaft.

4. The multi-functional apparatus of claim 3 wherein said actuator shaft disengages from said window wiper shaft when said electromagnetic device drives said main gear to be rotated to a predetermined positional range and when said cam follower concurrently rides along a ramp section of said camming surface while said window wiper shaft maintains its longitudinal position relative to said collar.

5. The multi-functional apparatus of claim 1 further comprising:

a rotatable member selectively driven by said electromagnetic device;

a driving interface surface mounted upon said rotatable member for causing movement of said linkage; and a primary linkage.

6. The multi-functional apparatus of claim 5 further comprising:

a secondary lock linkage coupled to said primary lock linkage;

said rotatable member rotating in a first rotational direction so as to first cause said driving interface surface to contact and cause movement of said primary lock linkage and then continue along said first rotational direction to subsequently contact and cause movement of said secondary lock linkage.

7. The multi-functional apparatus of claim 6 wherein:

said primary lock linkage causes locking of an automotive vehicle door lock when directly moved by said driving interface surface; and said secondary lock linkage causing unlocking of said door lock when directly moved by said driving interface surface.

8. The multi-functional apparatus of claim 5 wherein said window latch linkage is linearly movable in response to direct contact and movement of said driving interface surface mounted upon said rotatable member.

9. The multi-functional apparatus of claim 1 further comprising an automotive vehicle liftgate window release latch selectively movable in response to movement of said latch linkage.

10. The multi-functional apparatus of claim 1 wherein the latch linkage moves in a substantially linear manner.

11. A multi-functional automotive vehicle apparatus comprising:

a rotatable member;

an electric motor operable for selectively rotating said rotatable member;

a first intermittent motion mechanism selectively actuable in response to rotation of said rotatable member; and a second intermittent motion mechanism selectively actuable in response to rotation of said rotatable member independent from actuation of said first intermittent motion mechanism, a pivotal axis of said second intermittent motion mechanism being offset from said first intermittent motion mechanism;

at least one of said intermittent motion mechanisms being linearly movable in response to selective rotation of said rotatable member;

said rotatable member being rotatable in a first positional range where said first intermittent motion mechanism moves in response to movement of said rotatable member but where said second intermittent motion mechanism remains substantially stationary; and said rotatable member being rotatable in a second positional range where said second intermittent motion mechanism moves in response to movement of said rotatable member but where said first intermittent motion mechanism remains substantially stationary.

12. The multi-functional apparatus of claim 11 further comprising:

a window wiper shaft; and a clutch mechanism selectively coupling said window wiper shaft to said rotatable member, said clutch member being defined as one of said intermittent motion mechanisms.

13. The multi-functional apparatus of claim 12 wherein said clutch mechanism includes:

a stationary collar having a longitudinal bore therethrough interrupted by a camming surface; and an actuator shaft having a splined segment enmeshed with teeth of said rotatable member and longitudinally slidable in relation thereto, said actuator shaft further having a cam follower juxtapositioned for riding along said camming surface of said collar; and means for disengagably coupling said actuator shaft to said window wiper shaft.

14. The multi-functional apparatus of claim 11 wherein:

said first intermittent motion mechanism is defined as a primary lock linkage coupled to said second intermittent motion mechanism defined as a secondary lock linkage;

said rotatable member rotates in a first rotational direction so as to first cause a driving interface surface to contact and cause movement of said primary lock linkage and then continue along said first rotational direction to subsequently contact and cause movement of said secondary lock linkage.

15. The multi-functional apparatus of claim 11 further comprising a microprocessor electrically connecting to and controlling energization of said motor thereby causing selective incremental amounts of rotation less than 360° of said rotatable member.

16. The multi-functional apparatus of claim 11 wherein one of said intermittent motion mechanisms is defined as an automotive vehicle liftgate window release lock linkage selectively movable in response to rotation of said rotatable member.

17. The multi-functional apparatus of claim 11 further comprising a third intermittent motion mechanism selectively engagable with said rotatable member.

18. A multi-functional apparatus for use in an automotive vehicle comprising:

a first lock movable between a locked orientation and an unlocked orientation;

a first intermittent motion mechanism coupled to said first lock;

a second lock movable between a locked orientation and an unlocked orientation;

a second intermittent motion mechanism coupled to said second lock;

a single electromagnetic device operable for selectively moving said intermittent motion mechanisms;

a rotatable member selectively rotated by said electromagnetic device;

a window wiper shaft; and a clutch mechanism selectively coupling said window wiper shaft to said rotatable member.

19. The multi-functional apparatus of claim 18 wherein one of said locks is defined as an automotive vehicle liftgate window release lock.

20. An automotive vehicle apparatus comprising:

a door;

a panel moveably coupled to said door;

a rotatable member mounted on said door;

a wiper selectively actuable in response to movement of said rotatable member;

a first intermittent motion mechanism selectively actuable in response to rotation of said rotatable member; and an elongated linkage substantially lineally movable in response to actuation of said first intermittent motion mechanism.

21. The apparatus of claim 20 further comprising:

a second intermittent motion mechanism selectively actuable in response to rotation of said rotatable member;

an electromagnetic device operable for selectively rotating said rotatable member; and a microprocessor electrically connecting to and controlling energization of said electromagnetic device thereby causing selective incremental amounts of rotation less than 360° of said rotatable member to cause actuation of said intermittent motion mechanisms in different rotational positions of said rotatable member.

* * * * *